(12) United States Patent
Kitahara

(10) Patent No.: US 8,725,217 B2
(45) Date of Patent: May 13, 2014

(54) IN-VEHICLE DEVICE AND COMMUNICATION CONTROL METHOD

(75) Inventor: Toshio Kitahara, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 159 days.

(21) Appl. No.: 12/708,185

(22) Filed: Feb. 18, 2010

(65) Prior Publication Data

US 2010/0216401 A1   Aug. 26, 2010

(30) Foreign Application Priority Data

Feb. 23, 2009   (JP) .................................. 2009-039491

(51) Int. Cl.
*H04M 1/00* (2006.01)
*H04B 7/00* (2006.01)

(52) U.S. Cl.
USPC ...... 455/569.2; 455/41.1; 455/41.2; 455/41.3

(58) Field of Classification Search
USPC ............................ 455/569.2, 41.1, 41.2, 41.3
See application file for complete search history.

(56) References Cited

U.S. PATENT DOCUMENTS

| | | | |
|---|---|---|---|
| 7,734,315 B2 * | 6/2010 | Rathus et al. .............. | 455/569.2 |
| 8,036,715 B2 * | 10/2011 | Buck et al. ................. | 455/569.2 |
| 2003/0032460 A1 * | 2/2003 | Cannon et al. ................ | 455/569 |
| 2007/0072651 A1 * | 3/2007 | Suzuki et al. .............. | 455/569.2 |
| 2010/0097239 A1 * | 4/2010 | Campbell et al. ......... | 340/825.25 |
| 2010/0105322 A1 * | 4/2010 | Bertin .......................... | 455/41.1 |

FOREIGN PATENT DOCUMENTS

| | | |
|---|---|---|
| JP | A-2001-277962 | 10/2001 |
| JP | A-2002-51058 | 2/2002 |
| JP | A-2003-312391 | 11/2003 |
| JP | B2-3711394 | 8/2005 |
| JP | B2-3711394 | 11/2005 |
| JP | A-2006-121270 | 5/2006 |
| JP | A-2007-116254 | 5/2007 |

OTHER PUBLICATIONS

Dec. 18, 2012 Japanese Office Action issued in Japanese Patent Application No. 2009-039491 (with partial translation).

* cited by examiner

*Primary Examiner* — Wen Huang
(74) *Attorney, Agent, or Firm* — Oliff PLC

(57) ABSTRACT

An in-vehicle device is provided. A wireless communication section is configured to perform wireless communication with a plurality of mobile terminal devices in a vehicle. A specifying section is configured to specify each of the mobile terminal devices based on radio waves which are transmitted from the mobile terminal devices carried in the vehicle and are received by an antenna provided in the vehicle. An information acquiring section is configured to acquire service specifying information for specifying available services for each of the mobile terminal devices from each of the mobile terminal devices specified by the specifying section. A share setting section is configured to set whether or not to share at least one of the available services among the mobile terminal devices based on the service specifying information acquired by the information acquiring section.

9 Claims, 5 Drawing Sheets

FIG. 3

| OCCUPANT IDENTIFICATION INFORMATION | SERVICE | FUNCTION RESTRICTION |
|---|---|---|
| a | HANDSFREE | NO RESTRICTION |
| a | AV | NO RESTRICTION |
| n | HANDSFREE | RESTRICTION |
| ⋮ | ⋮ | ⋮ |

FIG. 4-1

| OCCUPANT IDENTIFICATION INFORMATION | SERVICE | FUNCTION RESTRICTION |
|---|---|---|
| a | MOBILE NAVIGATION | NO RESTRICTION |
| a | AV | NO RESTRICTION |

FIG. 4-2

| OCCUPANT IDENTIFICATION INFORMATION | SERVICE | FUNCTION RESTRICTION |
|---|---|---|
| b | HANDSFREE | NO RESTRICTION |

FIG. 4-3

| OCCUPANT IDENTIFICATION INFORMATION | SERVICE | FUNCTION RESTRICTION |
|---|---|---|
| b | HANDSFREE | RESTRICTION |

IN-VEHICLE DEVICE AND COMMUNICATION CONTROL METHOD

The disclosure of Japanese Patent Application No. 2009-039491 filed on Feb. 23, 2009 including specification, drawings and claims is incorporated herein by reference in its entirety.

BACKGROUND

The present invention relates to an in-vehicle device which performs wireless communication with a plurality of mobile terminal devices in a vehicle and a communication control method of wireless communication.

Recently, car navigation systems have come into wide spread use. Generally, an in-vehicle device which is capable of allowing users to listen to music and watch movies and displaying navigation information is mounted in a vehicle. Such an in-vehicle devices can communicate with the mobile terminal devices such as mobile phones and Personal Digital Assistants (PDAs) carried on occupants and transmit and receive data to an from the mobile terminal devices.

As a communication method for short-range wireless communication between communicable devices, there are wireless communication standards, for example, Bluetooth (registered trademark). Bluetooth is the wireless communication standard using a frequency band of 2.4 GHz, by which wireless communication within a several-meter radius is possible.

However, in the wireless communication between the in-vehicle device and the mobile terminal devices, Bluetooth allows the in-vehicle device and the mobile terminal devices to have a one-to-many corresponding relation. In this relation, the mobile terminal devices can identify the in-vehicle device, but the in-vehicle device cannot identify the mobile terminal devices. For this reason, a problem of crosstalk occurs between a plurality of mobile terminal devices. For example, with a hands-free function of the mobile terminal device, there is the inconvenience that communication may be performed through another mobile terminal device.

Thus, a related art sets a wireless communication device and each mobile terminal device to have one-to-one corresponding relation in the wireless communication such as Bluetooth. In this relation, the wireless communication device can perform wireless communication with each mobile terminal device by individually controlling each device so as to prevent crosstalk, and the wireless communication device can be shared by each mobile terminal device. Accordingly, it is possible to secure the confidentiality of wireless communication between the wireless communication device and each mobile terminal device by preventing crosstalk (see, Japanese Patent No. 3711394, Japanese Patent Publication No. 2002-51058A, Japanese Patent Publication No. 2001-277962A, Japanese Patent Publication No. 2003-312391A, and Japanese Patent Publication No. 2007-116254A).

As described above, the in-vehicle device (the wireless communication device) as a hardware can be shared by a plurality of mobile terminal devices. However, in the current situation where various kinds of services are available in the mobile terminal devices, it is difficult to share the services among the plurality of mobile terminal devices while securing the confidentiality of wireless communication.

For this reason, it is not possible to distinguish services which may be shared with the other mobile terminal devices from services which are not intended for sharing, and even a service not intended for sharing may be shared. For example, in a hands-free service, there is a problem that even when a user does not want to allow fellow passengers to hear the content of phone communication, the fellow passengers may hear the content of phone communication.

SUMMARY

It is therefore an object of at least one embodiment of the present invention to address the above disadvantages and other disadvantages not described above and to provide an in-vehicle device and the communication control method which are capable of sharing services among a plurality of mobile terminals while securing the confidentiality of services performed by wireless communication when sharing the services in a vehicle.

In order to achieve the above described object, according to a first aspect of at least one embodiment of the present invention, there is provided an in in-vehicle device comprising: a wireless communication section configured to perform wireless communication with a plurality of mobile terminal devices in a vehicle; a specifying section configured to specify each of the mobile terminal devices based on radio waves which are transmitted from the mobile terminal devices carried in the vehicle and are received by an antenna provided in the vehicle; an information acquiring section configured to acquire service specifying information for specifying available services for each of the mobile terminal devices from each of the mobile terminal devices specified by the specifying section; and a share setting section configured to set whether or not to share at least one of the available services among the mobile terminal devices based on the service specifying information acquired by the information acquiring section.

According to a second aspect of at least one embodiment of the present invention, there is provided communication control method which an in-vehicle device performs, the communication control method comprising: performing wireless communication with a plurality of mobile terminal devices in a vehicle; specifying each of the mobile terminal devices based on radio waves which are transmitted from the mobile terminal devices carried in the vehicle and are received by a wireless receiving device provided in the vehicle; acquiring service specifying information for specifying available services for each of the mobile terminal devices from each o from mobile terminal devices specified in the specifying step; setting whether or not to share at least one of the available services among the mobile terminal devices based on the service specifying information acquired in the acquiring step; and restricting the mobile terminal devices from sharing the at least one of the available services based on a setting in the setting step.

According to the above in-vehicle device and the communication control method, it is possible to share only services which are intended for sharing among the plurality of mobile terminal devices that can perform wireless communication in the vehicle and to restrict services which are not intended for sharing from being shared, thereby securing both the confidentiality of services performed in the wireless communication and the sharing of the services among the plurality of mobile terminal devices.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a diagram illustrating an example of a function restriction list file managed in an in-vehicle device according to the exemplary embodiment;

FIG. 4-1 is a diagram illustrating an example of a function restriction list file managed in a mobile terminal device according to the exemplary embodiment;

FIG. 4-2 is a diagram illustrating an example of the function restriction list file managed in the mobile terminal device before applying function restriction settings;

FIG. 4-3 is a diagram illustrating an example of the function restriction list file managed in the mobile terminal device after applying the function restriction settings;

DETAILED DESCRIPTION OF THE EMBODIMENTS

Hereinafter, an in-vehicle device and a communication control system according to an embodiment will be described with reference to the accompanying drawings. In the embodiment, a mobile phone is described as an example of a mobile terminal device, and Bluetooth is described as an example of a wireless communication method. However, the invention is not limited thereto, and is widely applied to any mobile terminal device having a wireless communication function. The wireless communication method may be another wireless communication method such as infrared communication, Wi-Fi (registered trademark), and Wi-MAX (registered trademark) or the like. In the accompanying drawings, it is not repeated that "Bluetooth" is a registered trademark.

Figure 1:
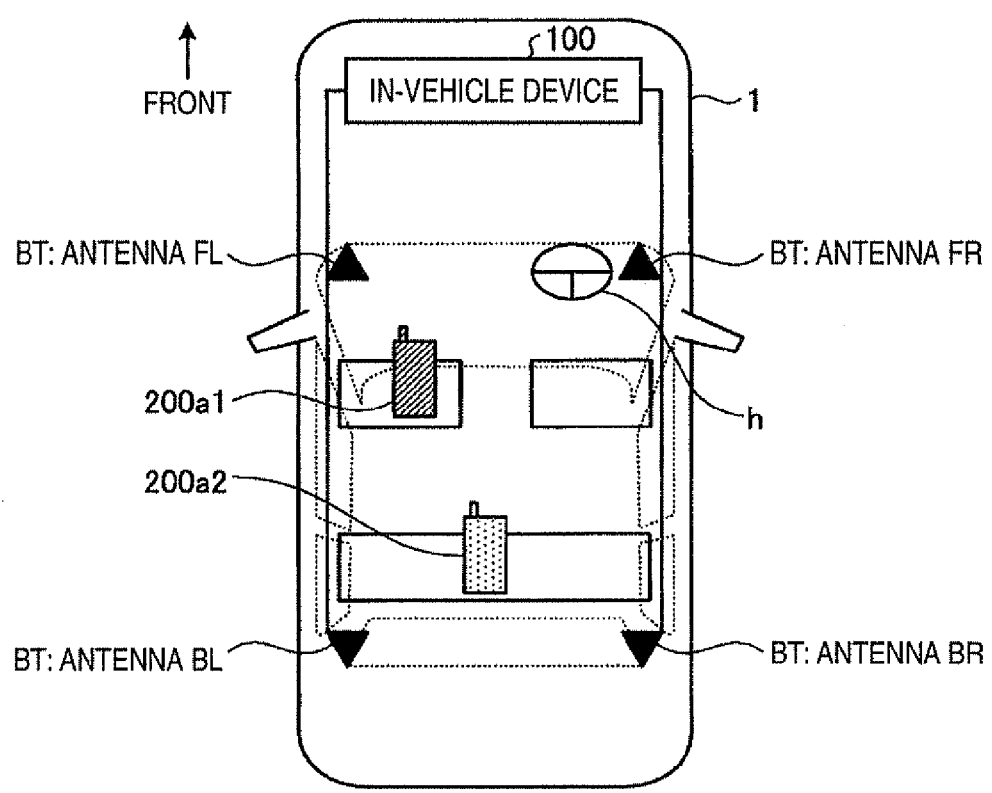
FIG. 1 is a diagram illustrating configuration of devices provided in a vehicle according to an exemplary embodiment of the present invention.

First, the configuration of devices provided in a vehicle 1 will be described with reference to FIG. 1. As shown in FIG. 1, an in-vehicle device 100 is disposed in an instrument panel of the vehicle 1, and BT (simplified form of Bluetooth) antennas FL, FR, BL, and BR are disposed in four corners of the inside of the vehicle and are connected to the in-vehicle device 100.

The BT antenna FL (Front-Left), FR (Front-Right), BL (Back-Left), or BR (Back-Right) communicates with a mobile phone terminal device 200a1 and a mobile phone terminal device 200a2 (hereinafter, a mobile phone terminal device 200 is the general term of mobile phone terminal devices) carried in the vehicle by using Bluetooth communication.

When there is a plurality of mobile phone terminal devices 200 which are carried in the vehicle, the in-vehicle device 100 selects the BT antenna FL, FR, BL, or BR capable of communicating with the maximum power (or power more than a predetermined threshold value) to communicate with the mobile phone terminal devices 200.

By selecting the BT antennas FL, FR, BL, and BR capable of communicating with the maximum power (or power more than a predetermined power), for example, when the BT antennas are disposed as shown in FIG. 1, it is possible to specify each of the mobile phone terminal devices 200 by the in-vehicle device 100.

In FIG. 1, a seat with a steering wheel h provided is a driver's seat. Accordingly, the position of the mobile phone terminal device 200 communicating with the BT antenna FR may be specified. It can be known that it is the mobile phone terminal device 200 carried by a driver by specifying the position. A passenger seat and rear seats on the left and right can be known in the same manner.

The configuration of the in-vehicle device 100, the steering wheel h, the BT antennas FL, FR, BL, and BR is not limited to the configuration shown in FIG. 1, and may be changed in design according to structural conditions of the vehicle 1. Particularly, the configuration and the number of BT antennas may be modified so as to communicate with the mobile phone terminal devices 200 carried in the vehicle using the optimal electrical wave condition. In addition, the number of mobile phone terminal devices 200 is not limited to two, more than three mobile phone terminal devices can be carried in the vehicle 1.

Figure 2:
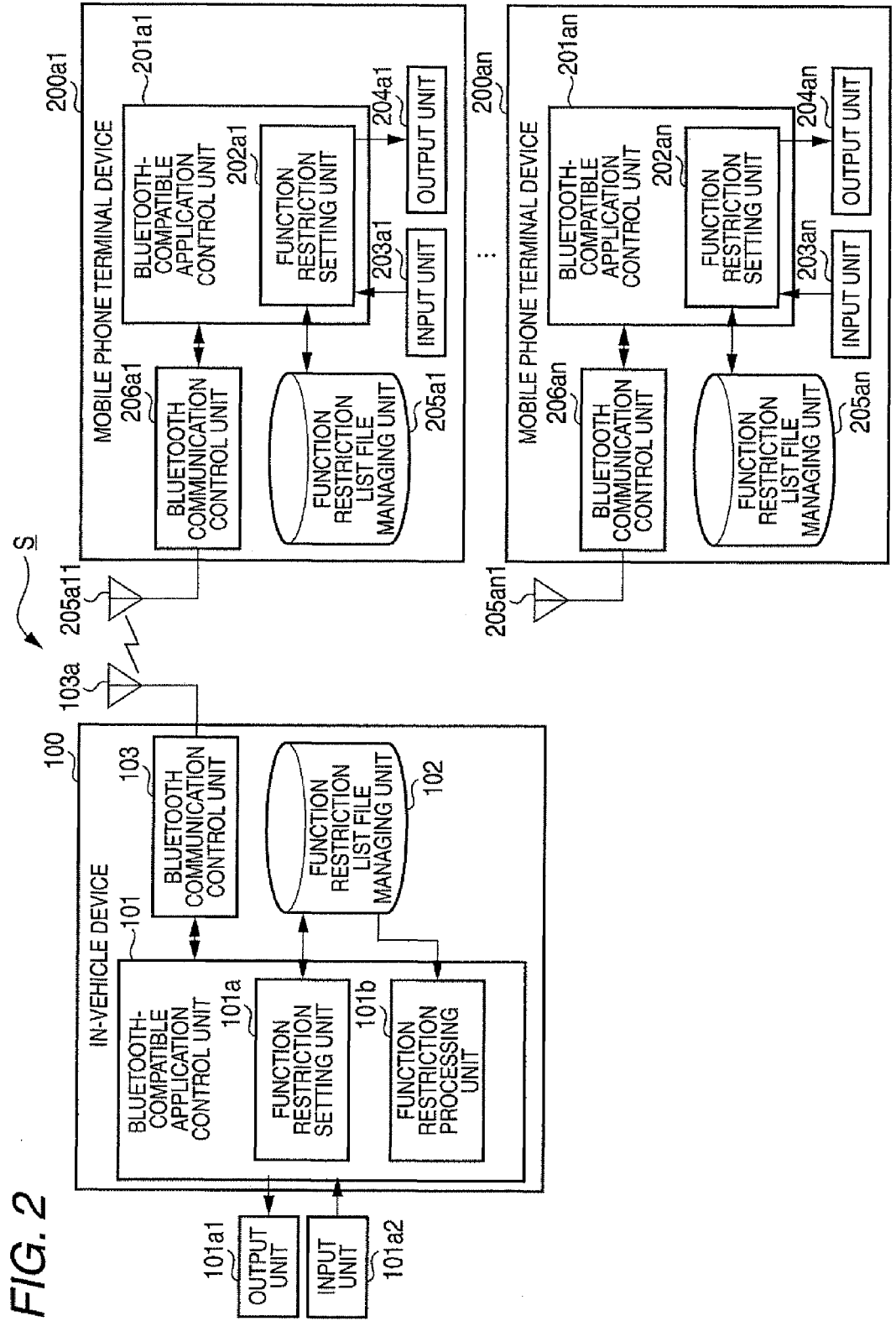
FIG. 2 is a functional block diagram illustrating a configuration of devices included in a communication system S according to the exemplary embodiment.

Next, a configuration of devices include in a communication system S according to an embodiment will be described with reference to FIG. 2. As shown in FIG. 2, the communication system S includes the in-vehicle device 100, a mobile phone terminal device 200a1, . . . , and a mobile phone device 200an (n is a positive integer which is not higher than the passenger capacity of the vehicle 1) which are carried in the vehicle 1.

The mobile phone terminal device 200 can use various compatible services (for example A2DP (Advanced Audio Distribution Profile, an advance music streaming service), HFP (Hands-Free Profile, a hands-free service), DUN (Dial-up Networking Profile, a dial-up service and the like) which are compatible with Bluetooth. These functions can be shared among the plurality of mobile phone terminal devices 200 by using the control of the in-vehicle device 100.

The in-vehicle device 100 is a device for sharing the services among the plurality of mobile phone terminal devices 200. The in-vehicle device 100 controls the sharing or non-sharing among the plurality of mobile phone terminal devices 200 according to the settings of sharing and non-sharing of services input from an input unit 101a2. The in-vehicle device 100 is provided with a Bluetooth-compatible application control unit 101 that is a control device such as a micro computer or the like, a function restriction list file managing unit 102 that manages function restriction information, and a Bluetooth communication control unit 103.

The Bluetooth-compatible application control unit 101 controls execution of applications which are compatible with Bluetooth. The Bluetooth-compatible application control unit 101 is provided with a function restriction setting unit 101a and a function restriction processing unit 101b.

The function restriction setting unit 101a applies the settings of the sharing or non-sharing of services input from the input unit 101a2 to a function restriction list file (see FIG. 3) managed by the function restriction list file managing unit 102.

The function restriction setting unit 101a applies function restriction information for each mobile phone terminal device 200 acquired from each of the mobile phone terminal devices 200 by Bluetooth communication to the function restriction list file managed by the function restriction list file managing unit 102.

Figure 6:
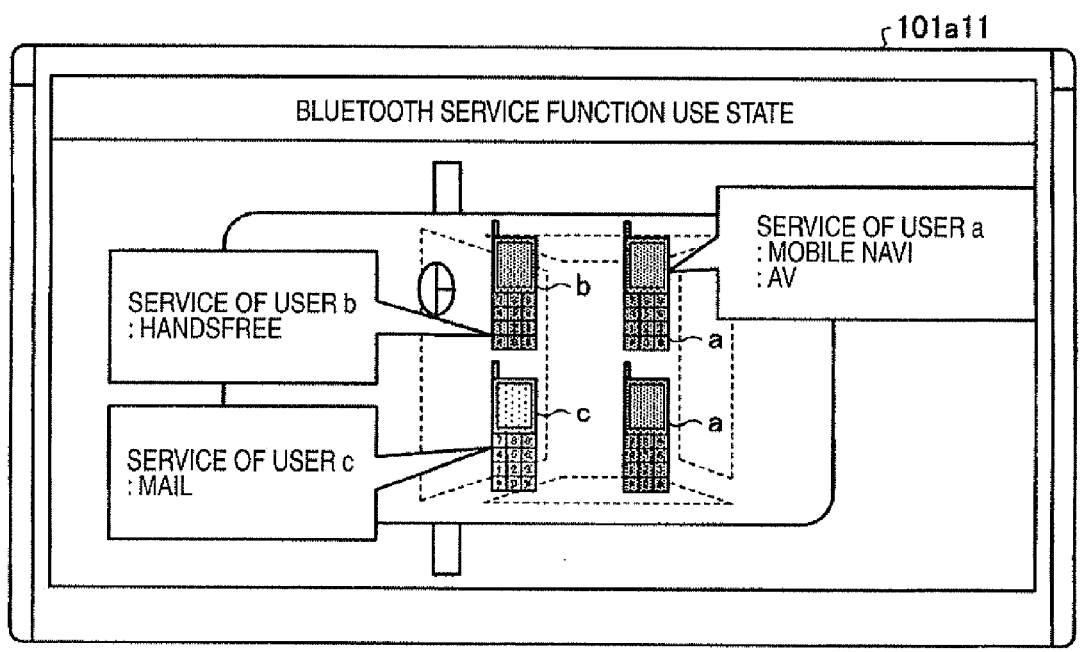
FIG. 6 is a diagram illustrating an example of a display of a service list of services operated in mobile terminal devices of occupants in a vehicle and intended for sharing.

The function restriction setting unit 101a reads data of the function restriction list file managed by the function restriction list file managing unit 102 and outputs the data to an output unit 101a1 such as a display screen of a display device. For example, as shown in FIG. 6, a list of services operated by the mobile terminal devices 200 of occupants of the vehicle 1 and intended to be shared is controlled so as to be displayed on a display screen 101a11 of the output unit 101a1.

The function restriction processing unit 101b performs control of restricting the sharing of the services which can be shared among the plurality of mobile phone terminals 200 on the basis of function restriction information stored in the function restriction list file managed by the function restriction list file managing unit 102. The Bluetooth communication control unit 103 controls Bluetooth communication with the mobile phone terminal devices 200 through an antenna 103a.

The function restriction processing unit 101b automatically performs function restriction of services according to the specified mobile phone terminal devices 200. When the positions of the mobile phone terminal devices 200 can be specified, the function restriction of services may be performed according to the corresponding positions.

For example, in terms of a service displaying television broadcasting programs or movies, a viewer watches a display image displayed on the display screen of the mobile phone terminal device 200. For this reason, it is preferable not to share the same service with a driver from the viewpoint of safety. That is, the function restriction processing unit 101b detects the seat positions of occupants carrying the mobile phone terminals 200, and avoids undesirable service sharing.

The function restriction processing unit 101b automatically performs the function restriction of the services according to the services performed in the mobile phone terminal devices 200. For example, a navigation function (mobile navigation) of the mobile phone terminal device 200 may not be shared when a car navigation device (not shown) is operating. That is, the function restriction processing unit 101b detects that a higher-function service than the service performed in the mobile phone terminal device 200 is operated by the in-vehicle device, thereby avoiding unnecessary service sharing.

Next, a configuration of the mobile phone terminal 200ai (i=1, 2, . . . , n, where n is not higher than the passenger capacity of the vehicle 1) will be described. The mobile phone terminal device 200ai is provided with a Bluetooth-compatible application control unit 201ai, an input unit 203ai, an output unit 204ai, a function restriction list file managing unit 205ai, a Bluetooth communication control unit 206ai, and an antenna 205ai1 connected to the Bluetooth communication control unit 206ai.

The Bluetooth-compatible application control unit 201ai controls the execution of applications which are compatible with Bluetooth. In addition, the Bluetooth-compatible application control unit 201ai may control the execution of applications which are compatible with Bluetooth by executing the same applications that have been previously installed. The Bluetooth-compatible application control unit 201ai is provided with a function restriction setting unit 202ai.

The function restriction setting unit 202ai transmits information (see FIG. 4-1) of a function restriction list file managed by the function restriction list file managing unit 205ai to the in-vehicle device 100, according to a request from the in-vehicle device 100.

The function restriction setting unit 202ai applies the settings of sharing or non-sharing of the services input from the input unit 203ai to the function restriction list file managed by the function restriction list file managing unit 205ai (for example, in comparing FIG. 4-2 and FIG. 4-3, the function restriction has been changed from no restriction to restricted).

When the function restriction list file managed by the function restriction list file managing unit 205ai is updated by the setting of sharing or non-sharing of the services input from the input unit 203ai, the function restriction setting unit 202ai transmits the update to the in-vehicle device 100 through the Bluetooth communication control unit 206ai.

The function restriction setting unit 202ai reads information of the function restriction list file of the mobile phone terminal device 200ai managed by the function restriction list file managing unit 205ai, and outputs the information to the output unit 204ai that is the display screen of the display device. The Bluetooth communication control unit 206ai controls Bluetooth communication with the in-vehicle device 100 through the antenna 205ai1.

Figure 5:
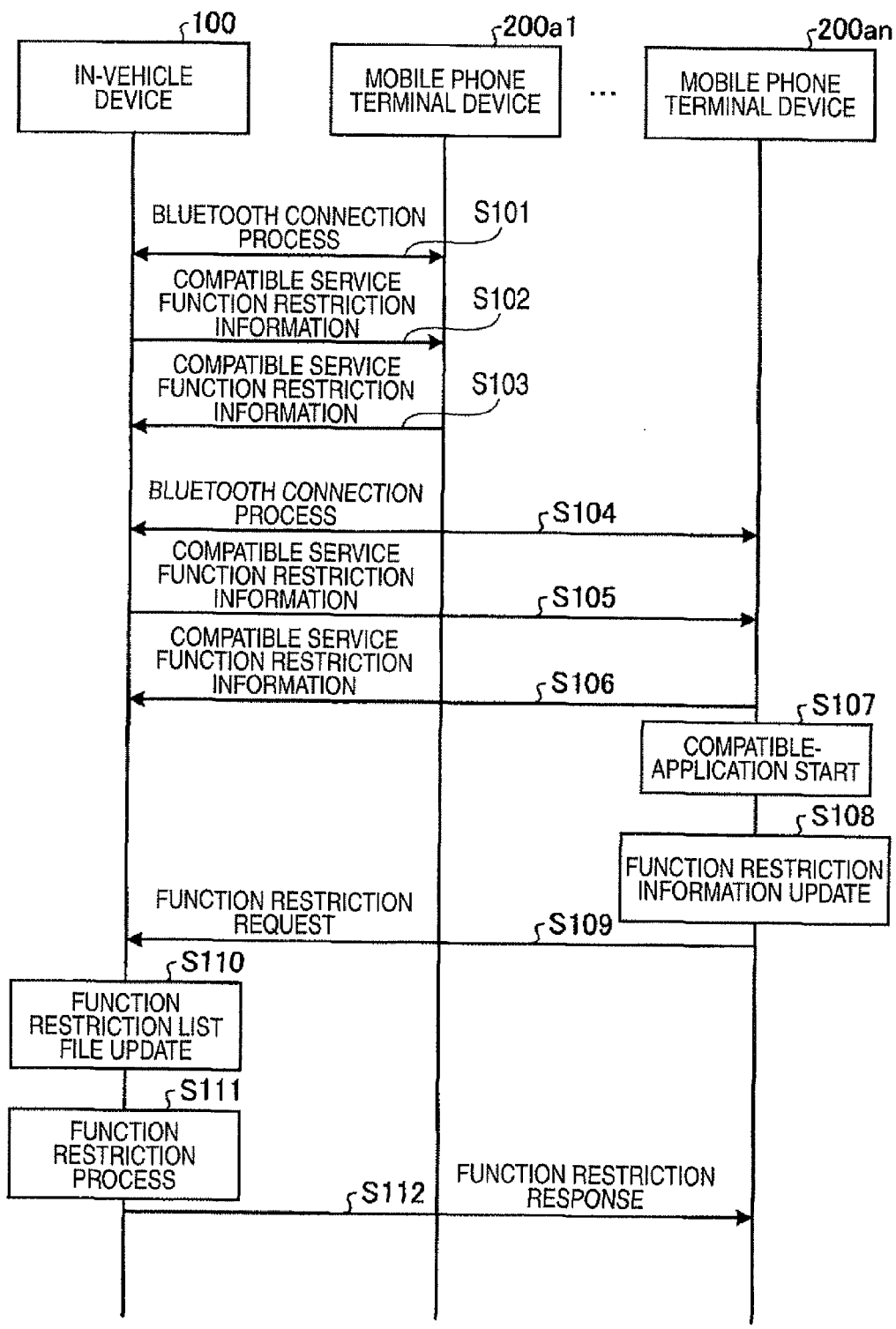
FIG. 5 is a sequence diagram illustrating a communication control process performed in the communication system S according to the exemplary embodiment.

Next, a communication control process performed in the communication system S according to an embodiment will be described with reference to FIG. 5. As shown in FIG. 5, the in-vehicle device 100 and the mobile phone terminal device 200ai (i=1, 2, . . . , n, where n is not higher than the passenger capacity of the vehicle 1) performs a communication connection process (Step S101). Hereinafter, the case of i=1 and n=2 will be described by way of example.

Subsequently, the in-vehicle device 100 requests the mobile phone terminal device 200ai to transmit function restriction information (information of the function restriction list file of the mobile phone terminal device 200ai managed by the function restriction list file managing unit 205ai) of the Bluetooth-compatible service (Step S102).

Subsequently, the mobile phone terminal device 200ai transmits the information of the function restriction list file of the mobile phone terminal device 200ai managed by the function restriction list file managing unit 205ai according to the request for transmission of the function restriction information of the Bluetooth-compatible service from the in-vehicle device 100 (Step S103).

In Step S104, the in-vehicle device 100 and the mobile phone terminal device 200aj (j=1, 2, . . . , n and j≠i, where n is not higher than the passenger capacity of the vehicle 1) performs a Bluetooth communication connection process. Hereinafter, the case of j=n=2 will be described by way of example.

Subsequently, the in-vehicle device 100 requests the mobile phone terminal device 200aj to transmit function restriction information (information of the function restriction list file of the mobile phone terminal device 200aj managed by the function restriction list file managing unit 205aj) of the Bluetooth-compatible service (Step S105).

Subsequently, the mobile phone terminal device 200aj transmits the information of the function restriction list file of the mobile phone terminal device 200aj managed by the function restriction list file managing unit 205aj according to the request for transmission of the function restriction information of the Bluetooth-compatible service from the in-vehicle device 100 (Step S106).

Subsequently, an application of the Bluetooth-compatible service is operated in the mobile phone terminal device 200aj (Step S107). The non-sharing is applied to the function restriction list file of the mobile phone terminal device 200aj managed by the function restriction list file managing unit 205aj according to the input settings of the non-sharing of the Bluetooth-compatible service operated in Step S107 by the user of the mobile phone terminal device 200aj, and the function restriction list file is updated (Step S108).

Subsequently, the mobile phone terminal device 200aj transmits the information of the non-sharing of the service of the function restriction list file updated in Step S108 to the in-vehicle device 100 (Step S109).

Subsequently, the in-vehicle device 100 applies the information of the non-sharing of the service received from the mobile phone terminal device 200aj to the function restriction list file managed by the function restriction list file managing unit 102, and updates it (Step S110). The in-vehicle device 100 performs a sharing restriction process (function restriction process) of the service (Step S111). Subsequently, the in-vehicle device 100 transmits the completion of the function restriction process to the mobile phone terminal device 200aj (Step S112).

According to the embodiment, in the in-vehicle device 100 for sharing the Bluetooth-compatible service among the plurality of mobile phone terminal devices 200 in the vehicle 1, the function restriction processing unit 101b performs the control of restricting the sharing of the service which can be shared among the plurality of mobile phone terminal devices 200 on the basis of the function restriction information stored in the function restriction list file managed by the function restriction list file managing unit 102. The restriction of the sharing of the service which can be shared is performed by the user settings of the mobile terminal devices 200 and/or the automatic settings according to the service operated in the mobile phone terminal devices 200 by the function restriction processing unit 101b. The restriction of the sharing of the service which can be shared may be performed according to the corresponding positions of the specified mobile phone terminal devices 200.

Accordingly, it is possible to guard the privacy of the mobile phone terminal devices 200 by restricting the sharing of the Bluetooth-compatible services which are not intended to be shared with fellow passengers of the vehicle 1 according to the user settings of the mobile phone terminal devices 200. The restriction of the sharing of the Bluetooth-compatible service is performed even by the automatic settings according to the service performed in the mobile phone terminal device 200, and thus it is possible to avoid unnecessary service sharing. In addition, when the Bluetooth-compatible service is restricted according to the corresponding positions of the mobile phone terminals 200, it is possible to secure safe driving.

The embodiment of the invention has been described above, but the invention is not limited thereto. The invention may be additionally embodied by various embodiments within the scope of the technical concept described in Claims. The advantages described in the embodiment are not limited thereto.

In the embodiment, all or a part of the process described as performed automatically in the described processes may be manually performed, or all or a part of the process described as performed manually in the described processes may be automatically performed by the known method. In addition, the process sequence, the control sequence, the specific names, and the information including various data or parameters may be arbitrarily modified except for the cases of special mention.

The constituent elements of the shown devices are functionally conceptual, and may not be necessarily physically configured as shown. That is, the specific form of distribution and combination of the devices is not limited to what is shown, and all or a part thereof may be configured by functional or physical distribution and combination by arbitrary units according to various kinds of loads or use conditions.

All or a part of the process functions performed by the devices may be realized by a micro computer such as a CPU (Central Processing Unit) (or a micro computer such as a MPU (Micro Processing Unit) and a MCU (Micro Controller Unit)), and programs analyzed and executed in the CPU (or the micro computer such as the MPU and MCU), or may be realized as hardware by wired logic.

The following technique is additionally disclosed with respect to the embodiment.

(1) An in-vehicle device comprising:

a wireless communication unit that performs wireless communication with a plurality of mobile terminal devices which are performing wireless communication of applications distributed through mutual authentication in a vehicle;

a position specification unit that specifies device identification information and corresponding positions of the mobile terminal devices on the basis of the electric field intensity of radio waves received by a plurality of antennas provided in the vehicle from the plurality of mobile terminal devices carried in the vehicle;

a service specification information acquiring unit that acquires available service specification information which specifies services available in the mobile terminal devices from the mobile terminal devices of which the device identification information and the corresponding positions are specified by the position specification unit through wireless communication performed by the wireless communication unit; and a service share setting unit that sets whether or not to share the services among the mobile terminal devices through the wireless communication on the basis of all the service specification information acquired from the mobile terminal devices by the service specification information acquiring unit.

(2) The in-vehicle device according to (1), further comprising a share restriction unit that restricts the sharing of the services through the wireless communication according to the share settings set by the service share setting unit.

(3) The in-vehicle device according to (1) or (2), further comprising a list display control unit that controls list display by merging all service specification information acquired by the service specification acquiring unit.

(4) The in-vehicle device according to any one of (1) to (3), wherein the service share setting unit performs the share setting according to the corresponding positions of the mobile terminal devices specified by the position specification unit.

(5) The in-vehicle device according to any one of (1) to (4), wherein the service share setting unit performs the share setting according to the available service specification information acquired by the service specification information acquiring unit.

(6) The in-vehicle device according to any one of (1) to (5), wherein the service share setting unit performs the share setting according to the share setting information received from the mobile terminal devices.

(7) The in-vehicle device according to any one of (1) to (6), wherein the service share setting unit is connected to an input unit that receives an input operation, and performs the share setting according to share setting information input from the input unit.

(8) The in-vehicle device according to any one of (1) to (7), further comprising a share setting changing unit that changes the share settings set by the service share setting unit according to the positions and/or the available service specification information of the mobile terminal devices.

A communication control method performed by an in-vehicle device, the method comprising:

a wireless communication step of performing wireless communication with a plurality of mobile terminal devices which are performing wireless communication of applications distributed through mutual authentication in a vehicle;

a position specification step of specifying device identification information and corresponding positions of the mobile terminal devices in the vehicle on the basis of the electric field intensity of radio waves received by a plurality of wireless receiving devices provided in the vehicle from the plurality of mobile terminal devices carried in the vehicle;

a service specification information acquiring step of acquiring available service specification information which specifies services available in the mobile terminal devices from the mobile terminal devices of which the device identification information and the corresponding positions are specified by the position specification step through wireless communication performed by the wireless communication step;

a service share setting step of setting whether or not to share the services among the mobile terminal devices through the wireless communication on the basis of all the service specification information acquired from the mobile terminal devices by the service specification information acquiring step; and a share restriction step of restricting the sharing of the services through the wireless communication performed by the wireless communication step according to the share setting set by the service share setting step.

While the present invention has been shown and described with reference to certain exemplary embodiments thereof, it will be understood by those skilled in the art that various changes in faun and details may be made therein without departing from the spirit and scope of the invention as defined by the appended claims.

What is claimed is:

1. An in-vehicle device comprising:
a wireless communication section configured to perform wireless communication with a plurality of mobile terminal devices in a vehicle;
an identifying section configured to identify each of the mobile terminal devices based on characteristics of received signals which are transmitted from the mobile terminal devices carried in the vehicle and are received by an antenna installed in the vehicle;
an information acquiring section configured to acquire service restricting information for restricting available services for each of the mobile terminal devices from each of the mobile terminal devices identified by the identifying section, the service restricting information contained on each of the mobile terminal devices in a function restriction list file; and
a share setting section configured to set whether or not to share at least one of the available services of a first mobile terminal device with a second mobile terminal device based on the service restricting information acquired by the information acquiring section.

2. The in-vehicle device as set forth in claim 1,
further comprising a restricting section configured to restrict the mobile terminal devices from sharing the at least one of the available services through the wireless communication based on a setting of the share setting section.

3. The in-vehicle device as set forth in claim 1,
further comprising a display control unit configured to merge the service restricting information acquired by the information acquiring section and control to display a list of the merged service restricting information.

4. The in-vehicle device as set forth in claim 1,
wherein the in-vehicle device is connectable to an input device configured to receive an input operation, and
wherein the share setting section sets whether or not to share the at least one of the available services of a first mobile terminal device with a second mobile terminal device based on setting information input through the input device.

5. The in-vehicle device as set forth in claim 1,
wherein the available services include a hands-free service and at least one of an advance music streaming service, a dial-up service and a mobile navigation service.

6. The in-vehicle device as set forth in claim 1, further comprising a function restriction list file managing unit configured to manage the function restriction list file for each of the mobile terminal devices, wherein when the information acquiring section acquires the service restricting information from each of the mobile terminal devices, the function restriction list file managing unit updates the function restriction list file.

7. A communication control method which an in-vehicle device performs, the communication control method comprising:
performing wireless communication with a plurality of mobile terminal devices in a vehicle;
identifying each of the mobile terminal devices based on characteristics of received signals which are transmitted from the mobile terminal devices carried in the vehicle and are received by a wireless receiving device installed in the vehicle;
acquiring service restricting information for restricting available services for each of the mobile terminal devices from each of the mobile terminal devices identified in the identifying step, the service restricting information contained on each of the mobile terminal devices in a function restriction list file;
setting whether or not to share at least one of the available services of a first mobile terminal device with a second mobile terminal device based on the service restricting information acquired in the acquiring step; and
restricting the mobile terminal devices from sharing the at least one of the available services based on a setting in the setting step.

8. The communication control method as set forth in claim 7,
wherein the available services include a hands-free service and at least one of an advance music streaming service, a dial-up service and a mobile navigation service.

9. The communication control method as set forth in claim 7, further comprising:
managing, in the in-vehicle device, the function restriction list file for each of the mobile terminal devices; and
updating, in the in-vehicle device, the function restriction list file when acquiring the service restricting information from each of the mobile terminal devices.

* * * * *